United States Patent [19]

Yukimoto et al.

[11] Patent Number: 4,906,707

[45] Date of Patent: Mar. 6, 1990

[54] CURABLE COMPOSITION OF OXYALKYLENE POLYMER

[75] Inventors: Sadao Yukimoto; Toshifumi Hirose; Katsuhiko Isayama, all of Hyogo, Japan

[73] Assignee: Kanegafuchi Kagaku Kogyo Kabushiki Kaisha, Osaka, Japan

[21] Appl. No.: 290,331

[22] Filed: Dec. 27, 1988

[30] Foreign Application Priority Data

Dec. 28, 1987 [JP] Japan ................................ 62-335798

[51] Int. Cl.$^4$ ............................................. C08G 65/32
[52] U.S. Cl. .................................... 525/403; 525/409; 528/25; 528/26; 528/29; 524/366
[58] Field of Search ................ 525/403, 409; 528/25, 528/29, 26; 524/366

[56] References Cited

U.S. PATENT DOCUMENTS

| | | | |
|---|---|---|---|
| 4,463,115 | 7/1984 | Hirose et al. | 525/403 |
| 4,665,127 | 5/1987 | Hirose et al. | 525/403 |
| 4,687,818 | 8/1987 | Kawakubo et al. | 528/26 |

*Primary Examiner*—Melvyn I. Marquis
*Assistant Examiner*—Karen A. Hellender
*Attorney, Agent, or Firm*—Armstrong, Nikaido, Marmelstein, Kubovcik & Murray

[57] ABSTRACT

A curable composition comprising an oxyalkylene polymer having reactive silicon groups and at least one other oxyalkylene polymer which contains no reactive silicon group and is either one containing hydroxyl groups and having a number average molecular weight of not less than 4,000 or one having essentially no hydroxyl group. The curable composition gives a cured product which imparts improved drying properties to alkyd paints applied to the cured product.

6 Claims, No Drawings

CURABLE COMPOSITION OF OXYALKYLENE POLYMER

FIELD OF THE INVENTION

The present invention relates to a curable composition comprising (i) an oxyalkylene polymer having a silicon-containing group which has a hydroxyl or hydrolyzable group attached to silicon atom and which is crosslinkable through the formation of a siloxane linkage (hereinafter referred to as a reactive silicon group) and (ii) a specific oxyalkylene polymer. The curable composition is characterized by the property that alkyd resin paints applied thereto have an improved drying property.

BACKGROUND OF THE INVENTION

Oxyalkylene polymers having reactive silicon groups are curable by the moisture in the air at room temperature yielding a rubbery substance similar to a room temperature curable silicone rubber. The cured substance is useful as a sealant, adhesive and the like owing to its excellent elongation, tensile strength, and adhesion.

One of the characteristics of polymers having reactive silicon groups is the advantage that, because the main chain is composed of an oxyalkylene polymer, almost all kinds of paints can be applied to the cured substance thereof. Incidentally, coating of silicone rubbers with paints is virtually impossible due to the water- and oil repellent nature of silicone rubber.

Cured products of a composition of an oxyalkylene polymer having reactive silicon groups, however, sometimes cause insufficient drying (hardening) of coated alkyd paints, and therefore it is virtually impossible to coat the cured products with the paints. As a result, in such a case attempts to coat a cured sealant of oxyalkylene polymer that contains plasticizers with alkyd paints were almost given up.

Alkyd paints, however, are used in various applications because of advantages in almost all respects over oil paints, e.g., by quick drying, hard and glossy films, excellent properties including adhesion, weathering resistance, oil resistance, and widely adjustable properties, through selection of the kinds of modifying drying oils, oil length and modes of modification. Therefore it is very advantageous for cured products of oxyalkylene polymers to be coated with alkyd paints.

At the beginning, even the cause of the poor drying property was entirely unclear. However, the present inventors, after a diligent study of the cause, found that incorporation of low molecular weight plasticizers in a curable composition comprising an oxyalkylene polymer having reactive silicon groups impairs the drying property. Plasticizers are used where it is neccessary to lower the viscosity of the composition (to improve workability at the time of application) or to improve the tensile property of the cured substance. Since it is simple to use plasticizers for lowering viscosity or improving the tensile property, the present inventors, after searching for materials which do not impair the drying property of alkyd paints, found that the above problem is eased by the use of a high molecular weight plasticizer.

Among high molecular weight plasticizers, oxyalkylene polymers are superior plasticizers since they are cheap and the cured products have excellent tensile properties at low temperature.

The present inventors have examined various oxyalkylene polymers, and found that when a specific oxyalkylene polymer is used as a plasticizer for an oxyalkylene polymer having reactive silicon groups, the cured product has a highly improved drying property.

SUMMARY OF THE INVENTION

According to the present invention a curable composition is provided comprising (A) an oxyalkylene polymer having at least one silicon-containing group which has a hydroxyl or hydrolyzable group attached to a silicon atom and which is crosslinkable by forming a siloxane linkage, and (B) at least one polymer selected from the group consisting of (i) an oxyalkylene polymer containing hydroxyl group, and having a number average molecular weight of not less than 4,000 and (ii) an oxyalkylene polymer having substantially no hydroxyl group, said curable composition being characterized in that alkyd resin paints applied thereto have an improved drying property.

DETAILED DESCRIPTION OF THE INVENTION

An oxyalkylene polymer having at least one reactive silicon group in its molecule [this polymer is hereinafter referred to as oxyalkylene polymer (A)] is used in the present invention. Examples of oxyalkylene polymer (A) are already disclosed in U.S. Pat. Nos. 3,971,751, 3,979,384 and 4,323,488, JP-B-45-36319, JP-B-46-12154 and JP-B-49-32673 (the term "JP-B" as used herein means an "examined Japanese patent publication") as well as JP-A-50-156599, JP-A-51-73561, JP-A-54-6096, JP-A-55-82123, JP-A-55-123620, JP-A-55-125121, JP-A-55-131022, JP-A-55-135135, and JP-A-55-137129, (the term "JP-A" as used herein means an "unexamined published Japanese patent application") incorporated herein by references.

The molecular chain of the oxyalkylene polymer (A) preferably has a recurring unit that is represented essentially by the general formula:

$$-R^1-O-$$

where $R^1$ is a substituted or unsubstituted divalent hydrocarbon group having 1 to 8 carbon atoms, preferably a hydrocarbon group having 3 or 4 carbon atoms.

Specific examples of $R^1$ include:

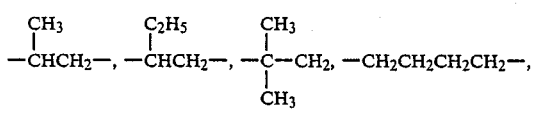

and the like.

The molecular chain of the oxyalkylene polymer may be composed of the same or different recurring units. A particularly preferred example of $R^1$ is

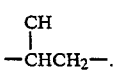

The molecular chain of oxyalkylene polymer (A) may contain recurring unit other than $-R^1-O-$. In such a case it is preferable that the sum of the recurring units $-R^1-O-$ in the oxyalkylene polymer (A) exceeds 60 wt %, and specifically exceeds 80 wt % of said polymer.

The reactive silicon groups in oxyalkylene polymer (A) or the silicon-containing functional groups that are capable of crosslinking by forming siloxane bonds, are well known in the art and are characterized by their ability to crosslink even at room temperature. Typical examples of such reactive silicon functional groups are represented by general formula (I):

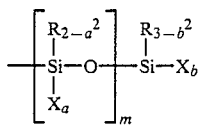

where $R^2$ is a substituted or unsubstituted monovalent organic group having 1 to 20 carbon atoms which may be the same or different; X is a hydroxyl group or a hydrolyzable group; a is 0 or an integer of 1 or 2; b is 0 or an integer of 1, 2 or 3, with the proviso that $1 \leq$ the sum of a and b, and preferably $1 \leq$ the sum of a and b $\leq 4$; and m is 0 or an integer of 1 to 19, however, not all of the m units

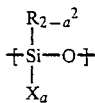

are necessarily the same.

Reactive silicon functional groups which are preferred for such reasons as economy are represented by general formula (II):

where $R^2$, X and b are the same as defined above.

Specific examples of the hydrolyzable group X in formula (I) or (II) include a halogen atom, a hydrogen atom, an alkoxy group, an acyloxy group, a ketoxime group, an amino group, an amido group, an aminooxy group, a mercapto group and an alkenyloxy group. Among these examples, alkoxy groups such as methoxy and ethoxy are preferred since they will undergo mold hydrolysis.

Specific examples of $R^2$ in formula (I) include alkyl groups having 1 to 20 carbon atoms such as methyl and ethyl, cycloalkyl groups having 3 to 20 carbon atoms such as cyclohexyl, aryl groups having 6 to 20 carbon atoms such as phenyl, and aralkyl groups having 7 to 20 carbon atoms such as benzyl. In formula (I) or (II), $R^2$ may be a triorganosiloxy group represented by the following formula:

where R' is a substituted or unsubstituted monovalent organic group, and preferably is a hydrocarbon group having 1 to 20 carbon atoms, such as a methyl group, phenyl group, etc., provided that the three R' are not necessarily the same. A particularly preferred example of $R^2$ in formula (I) or (II) is methyl.

In order to ensure satisfactory curability, the oxyalkylene polymer (A) preferably contains at least 1, more preferably at least 1.1, and most preferably 1.5 to 4, reactive silicon functional groups per molecule on the average. Such reactive silicon functional groups are preferably present at terminals of the molecular chain of the oxyalkylene polymer (A).

The oxyalkylene polymer (A) has a number average molecular weight which preferably ranges from 3,000 to 30,000, more preferably from 5,000 to 15,000. Oxyalkylene polymers (A) may be used either alone or in combination.

The oxyalkylene polymer (A) may be prepared by performing an addition reaction between hydrosilyl compound such as a compound having a formula in which hydrogen is bonded to a group of general formula (I) and an oxyalkylene polymer having a group having olefinic unsaturation (olefin group) represented by general formula (III):

(where $R^3$ is a hydrogen atom or a monovalent organic group having 1 to 20 carbon atoms; $R^4$ is a divalent organic group having 1 to 20 carbon atoms; c is 0 or 1) in the presence of a catalyst made of a metal of group VIII such as platinum.

Other methods for preparing the oxyalkylene polymer (A) are described below:

(1) reacting a hydroxyl-terminated polyoxyalkylene with a polyisocyanate compound such as toluene diisocyanate to form an isocyanate-terminated alkylene oxide polymer, and subsequently reacting the terminal isocyanate group with a W group in a silicon compound represented by general formula (IV):

where W is an active hydrogen containing group selected from among a hydroxyl group, a carboxyl group, a mercapto group and an amino group (primary or secondary); and b, $R^2$, $R^4$ and X are each the same as defined above;

(2) performing an addition reaction between an olefin group in an olefin-containing polyoxyalkylene represented by formula (III) and a mercapto group in a silicon compound of formula (IV) where W is a mercapto group; and (3) reacting a hydroxyl group in a hydroxyl-terminated polyoxyalkylene with a compound represented by general formula (V):

where $R^2$, $R^4$, X and b are each the same as defined above. It should be noted, however, that the oxyalkylene polymer (A) may be prepared by other methods.

In the preparation of oxyalkylene polymer (A) part or all of the X groups in the reactive silicon group may be converted to other hydrolyzable groups or a hydroxyl group. If the X group is a halogen atom or hydrogen atom, it is preferably converted to an alkoxy, acyloxy, aminoxy, alkenyloxy, hydroxyl group or some other group. In formula (III), $R^3$ is a hydrogen atom or a substituted or unsubstituted monovalent organic group having 1 to 20 carbon atoms, and is preferably a hydrogen atom or a hydrocarbon group, with the former being particularly preferred. In formula (III), $R^4$ is a divalent organic group having 1 to 20 carbon atoms and is preferably —$R^5$—, —$R^5OR^5$—,

(where $R^5$ is a hydrocarbon group having 1 to 10 carbon atoms), with a methylene group being particularly preferred. The olefin-containing alkylene oxide polymer may be prepared by various methods, such as a method in which olefin groups are introduced into a hydroxyl-terminated polyoxyalkylene by using an ether, ester, urethane or carbonate linkage as disclosed in JP-A-54-6097 and a method in which an epoxy compound such as ethylene oxide or propylene oxide is polymerized with an olefin-containing epoxy compound such as allyl glycidyl ether producing an alkylene oxide polymer having an olefin group in a side chain.

The above-mentioned oxyalkylene polymer (A) is used together with a specific oxyalkylene polymer (hereinafter referred to as oxyalkylene polymer (B)). The oxyalkylene Polymer (B) is used is to reduce the viscosity of the composition, to reduce the cost of the composition and to adjust properties of the composition such as hardness, modulus of elasticity, and the like, and also acts to improve the drying of alkyd paints applied to the cured product as compared with the case where low molecular weight plasticizers are combined with the oxyalkylene polymer (A).

The oxyalkylene polymer (B) is at least one oxyalkylene polymer selected from the group consisting of (i) an oxyalkylene polymer containing a hydroxyl group and having a number average molecular weight of not less than 4,000 and (ii) an oxyalkylene polymer having essentially no hydroxyl groups. The oxyalkylene polymer (B) is used as a plasticizer, and therefore does not contain (unlike the oxyalkylene polymer (A)) a room temperature crosslinkable group such as a reactive silicon group.

The oxyalkylene polymer (B) like the oxyalkylene polymer (A), contains, as monomer units constituting the main chain, not less than 60%, and preferably not less than 80% of monomer represented by —$R^1$—O—. As $R^1$, preferred is

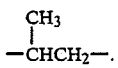

The number average molecular weight of the oxyalkylene polymer (B) (i) is required to be not less than 4,000, preferably not less than 4,500, and is, most preferably 5,000 to 15,000. When the number average molecular weight is less than 4,000 and the polymer has a hydroxyl group, drying of a paint film becomes worse when an alkyd paint is applied to the cured substance.

Furthermore, a polymer containing not more than 10% of components having a number average molecular weight of 1,000 or less (ratios from the value obtained by GPC method, and the same hereinafter) is preferable from the standpoint of obtaining better drying property of the alkyd resin paint. A polymer containing not more than 5% of these components is particularly preferable as polymer (B) (i).

As for the molecular weights of oxyalkylene polymer (B) (i), those having a narrow distribution of molecular weight, or having a small ratio of weight average molecular weight ($\overline{M}w$)/number average molecular weight($\overline{M}w$) are preferred because of a lower amount of lower molecular weight components and, thereby, a better drying property of the alkyd paint to be applied. Preferred are those having an $\overline{M}w/\overline{M}n$ of 2 or less, and, more preferably, not more than 1.5.

Examples of oxyalkylene polymers (B) (i) include polyoxypropylene glycols which have either a molecular weight of not less than 4,000 and a narrow molecular weight distribution or a molecular weight of not less than 4,000 and a small amount of components of molecular weight of 1,000 or less. A part of the hydroxyl groups in the polyoxypropylene glycols can be blocked by hydrocarbon groups such as alkyloxy, alkylphenyloxy, alkenyloxy, allyloxy, etc., or which are blocked through such linkages such as urethane, ester, urea, carbonate, etc. by hydrocarbon groups such as alkyl, aryl, alkenyl, etc.

The oxyalkylene polymer (B) (ii) is a polymer which essentially has no hydroxyl groups. When a hydroxyl group is contained in the polymer, the drying property of alkyd paints applied on the cured product tends to be worsened. The drying property of the alkyd paint is further improved where the number average molecular weight of the oxyalkylene polymer (B) (ii) is large. Since oxyalkylene polymers are produced by an ionic polymerization of alkylene oxides, the polymers normally have hydroxyl groups, and terminal hydroxyl groups in particular. There are various methods for obtaining the oxyalkylene polymer (B) (ii) from an oxyalkylene polymer having hydroxyl groups. For example, utilizing the reactivity of the hydroxyl groups, not less than 90 mol%, or preferably not less than 95 mol % of the hydroxyl groups, are converted to groups other than a hydroxyl group by introducing substituted or unsubstituted hydrocarbon groups. Examples of the polymers having hydroxyl groups converted to other groups include (as mentioned hereinbefore) oxyalkylene polymers in which the terminal hydroxyl groups are blocked through such linkages as ether, urethane, ester, urea, carbonate, etc. by substituted or unsubstituted hydrocarbon groups including alkyl groups such as methyl, ethyl, propyl, chloromethyl benzyl, and glycidyl, aryl groups such as phenyl, tolyl and chlorophenyl; and alkenyl groups such as vinyl and allyl; said substituted or unsubstituted hydrocarbon groups being preferably $C_1$ to $C_{40}$ hydrocarbon groups. However, oxyalkylene polymers other than these may be used so long as essentially no hydroxyl groups are contained therein.

Of the above-mentioned oxyalkylene polymers (B) (ii), it is convenient to use oxyalkylene polymers having alkenyl groups, because these can be raw materials for the oxyalkylene polymer (A).

Although the molecular weight of the oxyalkylene polymer (B) (ii) is not restricted, a desirable application of alkyd paints is obtained where the molecular weight of the oxyalkylene polymer (B) (ii) is not less than 1,000. A molecular weight of not less than 4,000, particularly not less than 4,500 is more preferable, and most preferable is a molecular weight of 5,000 to 15,000. At the same time, the above description of the content of the components having a number average molecular weight of 1,000 or below and of the molecular weight distribution for the oxyalkylene polymer (B) (i) is also true of the oxyalkylene polymer (B) (ii) i.e., the lower the content of the components having a number average molecular weight of 1,000 or below, the more desirable the polymer is, with a minimum $\overline{M}w/\overline{M}n$ being particularly preferred.

The oxyalkylene polymers (B) may be used alone or in combination. On the other hand, the oxyalkylene polymers (B) may be incorporated as a plasticizer in the stage of producing the oxyalkylene polymers (A).

The preferred amount of the oxyalkylene polymer (B) used in the curable composition is, based on 100 parts of oxyalkylene polymer (A) (by weight and the same hereinafter), 10 to 500 parts, in particular 20 to 200. Where the amount is less than 10 parts, the plasticizing effect is so slight that a reduction of the modulus of elasticity and an increase in elongation are not practically realized, whereas an amount in excess of 500 parts brings about a slow curing rate.

The composition of the present invention may contain other additives such as curing promoters, fillers, etc. Examples of curing promoters usable in the present invention include organo-tin compounds, acidic esters of phosphoric acid, reaction products of acidic esters of phosphoric acid and amines, saturated or unsaturated multi-valent carboxylic acids or anhydrides thereof, organo-titanates, organo-aluminium compounds, organo-zirconium compounds and the like.

Examples of organo-tin compounds include dibutyl-tin dilaurate, dioctyl-tin dimaleate, dibutyl-tin phthalate, tin octylate, dibutyl-tin methoxide.

Acidic esters of phosphoric acid are phosphates containing

portion, e.g., acidic organo-phosphates represented by the formula

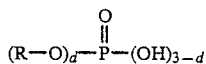

where d is 1 or 2; and R is a residue of an organic group. Examples of which include:

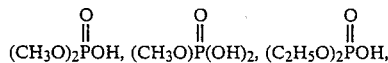

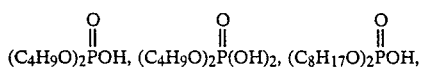

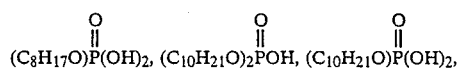

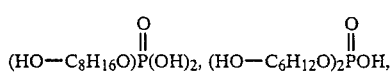

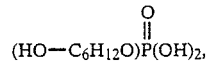

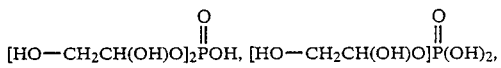

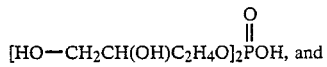

Examples of organo-titanates include titanates such as tetrabutyl titanate, tetraisopropyl titanate, and triethanol amine titanate.

The amounts of these titanates used as curing promoter are preferably 0.1 to 20 parts per 100 parts of the oxyalkylene polymer (A).

Examples of fillers include heavy calcium carbonate, light calcium carbonate, hard calcium carbonate, kaolin, talc, silica, titanium dioxide, aluminium silicate, magnesium oxide, zinc oxide, carbon black, etc.

Examples of other additives include antisagging agents such as hydrogenated castor oil, organo-bentonite, etc., colorants and antioxidants.

Needless to say, in the composition of the present invention, low molecular weight plasticizers such as dioctyl phthalate may be used to the extent that the effect of the present invention is not hindered.

The above-mentioned composition of the present invention can be used for applications which include adhesives, water repellent paints, sealants, molds, casting rubbers and foams.

A typical composition as: a sealant for architectural use consists of 100 parts of the oxyalkylene polymer (A), 10 to 300 parts of inorganic fillers such as calcium carbonate, talc, kaolin, etc. and, as necessary, suitable amounts of other ingredients which include pigments such as titanium dioxide, carbon black, etc., antioxidants such as ultraviolet absorbers, radical chain terminators, etc., and air drying compounds such as drying oils, synthetic drying oils, etc. The composition is sufficiently homogenized by milling in a kneader, paint roller, or the like. After application of the composition, exposure thereof to the moisture in the surrounding air causes the composition to quickly cure—i.e., curing in one hour to a few days, and provides a rubbery elastomer having excellent weathering resistance and elongation.

The improvements over existing art brought about when the composition is used as a water repellent paint include higher resistance to blistering, peeling, etc., because of an excellent balance between rupture strength and elongation, durability and water resistance.

For use as an adhesive, application as a structural adhesive is useful because of excellent bond strength of the composition, particularly, an excellent balance between peel-bond strength and shear-bond strength.

When coating the cured substance of the composition of the present invention with alkyd paints, it is most desirable to apply the paints after the composition has almost completely cured. The advantages of doing so are, for example, ease of painting because the paint is applied to the cured substrate thus rendered suitable as a substrate, and the fact that the passage of water needed for curing the oxyalkylene polymer (A), which is interrupted by the paint film, is not necessary. However, the composition of the present invention may be coated with the alkyd paints when the composition becomes tack-free, i.e., the state where the surface layer has been solidified.

The above-mentioned alkyd paints have no specific restrictions. The paints have as their main ingredients so-called oil modified alkyd resins obtained by modifying the condensates of polybasic acids (phthalic anhydride, maleic anhydride, etc.) and polyhydric alcohols (glycerine, pentaerithrytol, ethylene glycol, trimethylol ethane, etc.) with fatty oils or fatty acids (linseed oil, soybean oil, castor oil, safflower oil, etc.) and modified alkyd resins obtained by modifying the alkyd resins with other resins or vinyl monomers, or the like. The alkyd paints herein referred to include those useful for any type of application, for example, alkyd resin varnishes or alkyd resin enamels for rolling stock, aircraft and general industries, alkyd ready-mixed paints (or synthetic resin ready-mixed paints) for architecture, bridges and ships, and alkyd primers for automobiles, machinery, electric appliances and furniture. Particularly remarkable effects of the composition of the present invention are exerted on long-oil alkyd paints containing a large quantity of drying oil and used for general purposes.

When coating a cured product of the oxyalkylene polymer (A) admixed with low molecular weight plasticizers, the principle hitherto adopted was that alkyd paints could not be used unless the cured substance was previously coated with paints other than alkyd paints (primers). This was because drying of alkyd paints directly coated on the cured substance was so retarded that the paint film remained tacky even after about one month's drying time. However, use of the composition of the present invention, even in a system of an oxyalkylene polymer (A) and plasticizers, enables an ordinary coating procedure to be used to form a normal alkyd paint film on the cured substance.

Examples given below illustrate the composition of the present invention.

SYNTHESIS EXAMPLE 1

800 g of oxypropylene polymer having an average molecular weight of about 8,000 having allyl ether groups introduced, to 97% of all the terminal thereof, was placed in a pressure proof reactor equipped with an agitator, and then 19 g of methyldimethoxysilane was added. Further, 0.34 ml of a catalyst solution comprising chloroplatinic acid (8.9 g of $H_2PtCl_6.6H_2O$ dissolved in a solvent mixture of 18 ml of isopropyl alcohol and 160 ml of tetrahydrofuran) was added, and the mixture was reacted at 80° C. for 6 hours.

It was confirmed by IR spectrometry that hydrosilyl groups scarcely remained in the reaction solution. The result of quantitative analysis of reactive silicon group by NMR method indicated that an oxypropylene polymer having about 1.7 $(CH_3O)_2Si(CH_3)CH_2CH_2C-H_2O-$ groups per molecule at terminals thereof was obtained.

EXAMPLES 1 to 5 AND COMPARATIVE EXAMPLES 1 to 2

Compositions comprising the oxyalkylene polymer (A) obtained in Synthesis Example 1, oxyalkylene polymers (B), and the other components identified in Table 1 were converted into sheets of 3 mm thickness, which were cured for one day at room temperature.

An alkyd paint (trademark: Rockcoat of Rock Paints, Ltd.) was applied onto the sheet, and the hardening state of the film was evaluated by touch with a finger after the lapse of days as shown in Table 1. The results are shown in Table 1.

In Table 1, 1 to 5 in the column of the oxyalkylene polymer (B) denote the follow:

(1): oxypropylene polymer having $\overline{M}n=7,500$, $\overline{M}w/\overline{M}n=1.8$, both ends composed of allyloxy group, with no hydroxyl group;

(2): oxypropylene polymer having $\overline{M}n=5,200$, $\overline{M}_w/\overline{M}_n=1.6$, both ends composed of allyloxy group;

(3): oxypropylene polymer having $\overline{M}n=5,100$, $\overline{M}w/\overline{M}n=1.1$, 4% of components of no more than MW 1,000, ends composed of hydroxyl groups;

(4): oxypropylene polymer having $\overline{M}n=4,000$, $\overline{M}w/\overline{M}n=1.1$, both ends composed of allyl ether;

(5): oxypropylene polymer having $\overline{M}n=2,400$, $\overline{M}w/\overline{M}n=1.1$, both ends composed of allyl ether.

Figures in the column of evaluation results indicate hardening degrees of alkyd paint films applied, The hardening degrees are:

5: complete hardening;
4: slight surface tack despite hardening of the film;
3: slight adhesion of paint on the finger when the film is touched by finger;
2: adhesion of paint on the finger despite partial hardening of the film;
1: increase in viscosity in the paint film;
0: no change in the paint film.

The results in Table 1 clearly indicate that the use of an oxypropylene polymer whose terminal hydroxyl groups have been blocked as indicated in Examples 1, 2, 4 and 5 brings about better hardening of alkyd paints in comparison with the case where lower molecular weight plasticizers or oxypropylene polymers having hydroxyl groups are used.

Example 3 indicates that the use of an oxypropylene whose molecular weight is not less than 4,000 brings about better hardening of alkyd paints in comparison with the case where a lower molecular weight polypropylene glycol is used.

TABLE 1

| | Example | | | | | Comparison | |
|---|---|---|---|---|---|---|---|
| | 1 | 2 | 3 | 4 | 5 | 1 | 2 |
| Composition (parts) | | | | | | | |
| Oxypropylene polymer (A) of Synthesis Example 1 | 100 | 100 | 100 | 100 | 100 | 100 | 100 |
| Oxyalkylene polymers (B) | | | | | | | |
| (1) | 40 | — | — | — | — | — | — |
| (2) | — | 40 | — | — | — | — | — |
| (3) | — | — | 40 | — | — | — | — |
| (4) | — | — | — | 40 | — | — | — |

TABLE 1-continued

|  | Example | | | | | Comparison | |
| --- | --- | --- | --- | --- | --- | --- | --- |
|  | 1 | 2 | 3 | 4 | 5 | 1 | 2 |
| (5) | — | — | — | — | 40 | — | — |
| Oxypropylene polymer *1 | — | — | — | — | — | 40 | — |
| Lower molecular weight plasticizer *2 | — | — | — | — | — | — | 40 |
| Calcium carbonate *3 | 140 | 140 | 140 | 140 | 140 | 140 | 140 |
| Titanium dioxide *4 | 20 | 20 | 20 | 20 | 20 | 20 | 20 |
| Antisagging agent *5 | 2 | 2 | 2 | 2 | 2 | 2 | 2 |
| Aminosilane compound *6 | 2 | 2 | 2 | 2 | 2 | 2 | 2 |
| Curing promoter *7 | 2 | 2 | 2 | 2 | 2 | 2 | 2 |
| Evaluation results | | | | | | | |
| Hardening of alkyd paint after: | | | | | | | |
| one day | 4 | 4 | 0 | 3 | 3 | 0 | 0 |
| 3 days | 5 | 4 | 2 | 4 | 3 | 1 | 0 |
| 7 days | 5 | 5 | 3 | 4 | 4 | 2 | 0 |
| >12 days | 5 | 5 | 5 | 5 | 5 | 3 | 1 |

Note:
*1: polypropylene glycol having $\overline{M}n = 3,000$, $\overline{M}w/\overline{M}n = 1.1$;
*2: dioctylphthalate;
*3: CCR of Shiraishi Kogyo Ltd.;
*4: Rutile type titanium dioxide Trade mark: R-820 of Ishihara Sangyo Kaisha, Ltd.:
*5: Hydrogenated castor oil;
*6: A-1120 of Nihon Unicar Ltd.;
*7: #918 of Sankyo Yukigoshei Ltd.

While the invention has been described in detail and with reference to specific embodiments thereof, it will be apparent to one skilled in the art that various changes and modifications can be made therein without departing from the spirit and scope thereof.

What is claimed is:

1. A curable composition comprising
   (A) an oxyalkylene polymer having at least one reactive silicon-containing group which is room temperature crosslinkable, in which a hydroxyl or hydrolyzable group is attached to a silicon atom, and which is crosslinkable by forming a siloxane linkage, and
   (B) at least one polymer which does not contain a reactive silicon-containing group which is room temperature curable and is selected from the group consisting of (i) an oxyalkylene polymer containing a hydroxyl group and having a number average molecular weight of not less than 4,000 and (ii) and oxyalkylene polymer having essentially no hydroxyl group.

2. The composition of claim 1 wherein the oxyalkylene polymer constituting the component (B) has a ratio of weight average molecular weight number average molecular weight of not more than 1.5.

3. The composition of claim 1 wherein the oxyalkylene polymer constituting the component (B) has not more than 10% by weight of components having a molecular weights of not more than 1,000.

4. The composition of claim 1 wherein the oxyalkylene polymer constituting the component (B) (i) has a number average molecular weight of not less than 5,000.

5. The composition of claim 1 wherein the oxyalkylene polymer constituting the component (B) (ii) is a polymer having allyl ether group at its terminals.

6. The composition of claim 1 wherein the oxyalkylene polymer constituting the component (B) (ii) has a number average molecular weight of not less than 1,000.

* * * * *